March 17, 1964 J. M. KAPUSTA 3,125,363
VEHICLE LOCKING HUB
Filed May 2, 1961 3 Sheets-Sheet 1

INVENTOR.
John M. Kapusta,
BY
Attorneys.

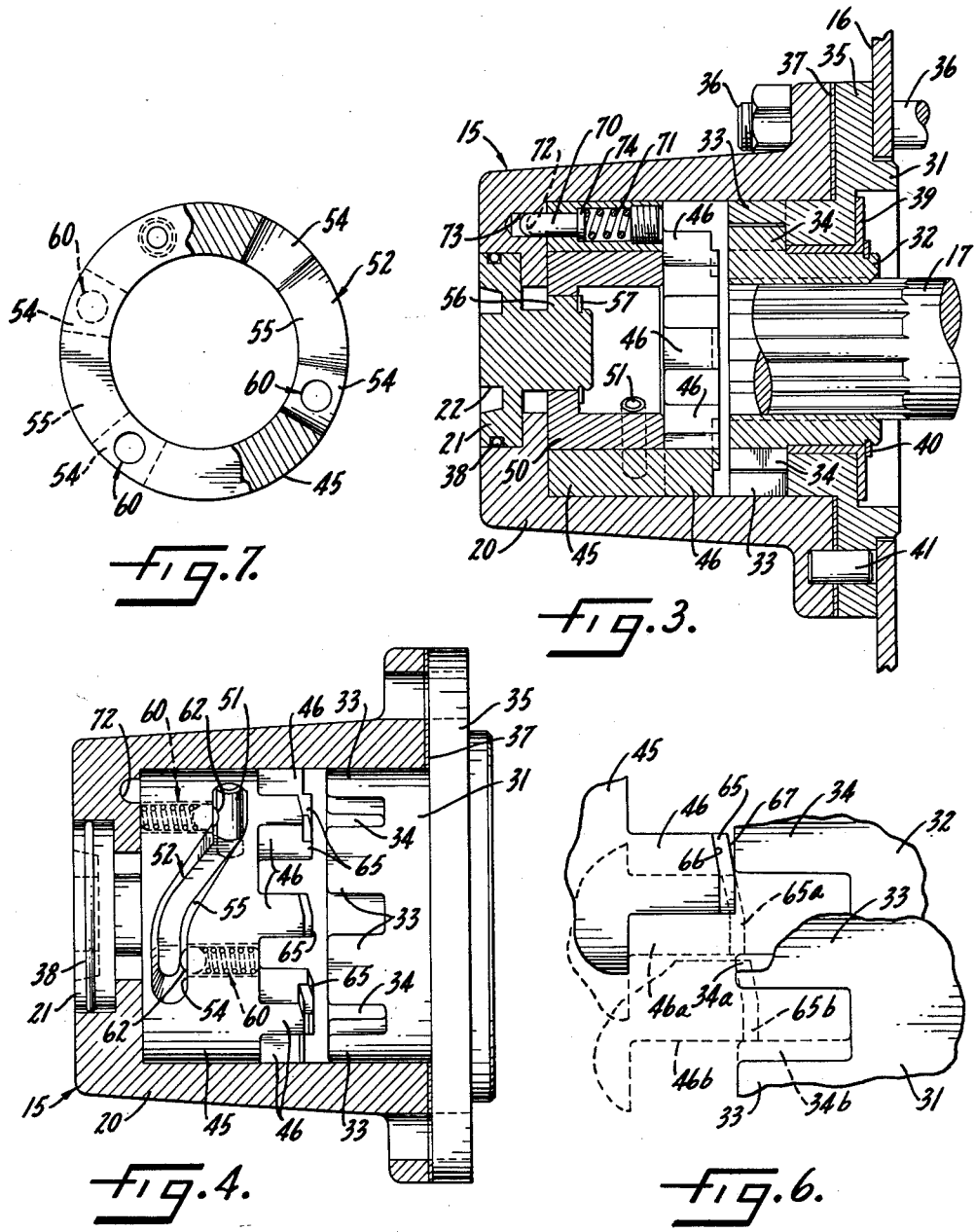

March 17, 1964    J. M. KAPUSTA    3,125,363
VEHICLE LOCKING HUB
Filed May 2, 1961    3 Sheets-Sheet 3
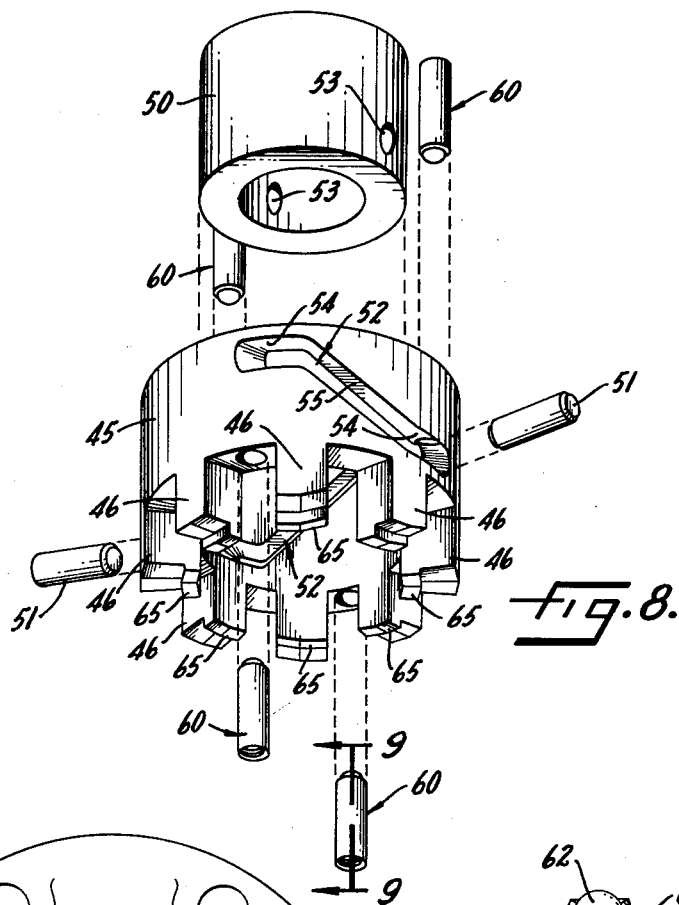
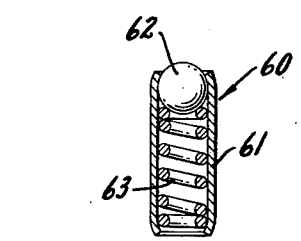
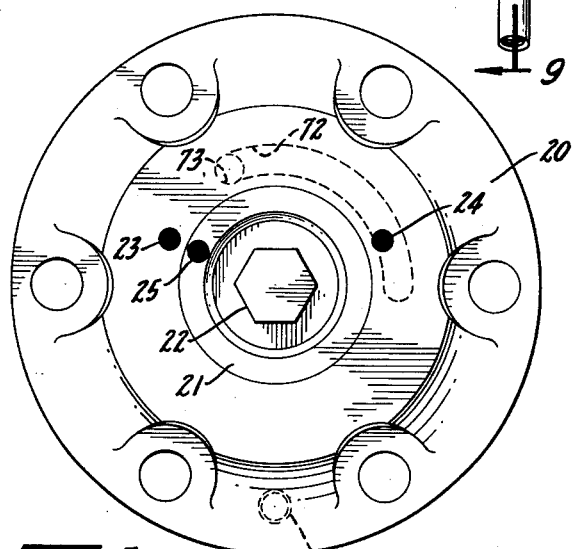
INVENTOR.
John M. Kapusta,
BY
Wolfe, Hubbard, Voit & Osann
Attorneys.

3,125,363
VEHICLE LOCKING HUB
John M. Kapusta, Stickney, Ill., assignor to Cutlas Tool and Mfg. Co., Lyons, Ill.
Filed May 2, 1961, Ser. No. 107,174
6 Claims. (Cl. 287—53)

This invention relates generally to vehicle hubs and more particularly concerns a lockable hub for selectively coupling a vehicle wheel to its axle.

When operating four wheel drive vehicles, it has been found very desirable to uncouple the front wheels from their axles when the vehicle is operated in normal rear wheel drive. This avoids running the front differential and associated parts through rotation of the front wheels. For this purpose, special locking hubs have been utilized to mount the front wheels of four wheel drive vehicles on their front axles. The locking hubs include devices for selectively disconnecting the supported wheel from its axle.

It is an object of the present invention to provide an improved locking hub for the purpose described above that is particularly easy to manipulate. The hub of the invention utilizes a single rotatable control element which cannot jam and which need be oscillated through only approximately 135° to effect full locking or complete unlocking. A related object is to provide a hub of the above type which can be locked or unlocked smoothly, without "rocking" the vehicle.

A further object is to provide a locking hub as characterized above that is solid, strong and reliable. A collateral object is to provide a hub of the above type which will "fail safe." That is, should the locking element crack or otherwise fail when set in locked position, the hub will remain solidly locked.

Another object is to provide a locking hub having the above characteristics which is also compact and economical to manufacture.

Other objects and advantages of the invention will become apparent upon reading the following detailed description and upon reference to the drawings, in which:

FIG. 3 is a section taken approximately along the line 3—3 in FIG. 2;

FIG. 4 is similar to FIG. 3 but shows certain of the interior parts in elevation rather than in section;

FIG. 5 is similar to FIG. 2 but with certain hidden lines removed for clarity and showing the detent arrangement;

FIG. 6 is an enlarged fragmentary elevation of successive positions of the parts as the hub is locked;

FIG. 7 is a partially sectioned end elevation of the locking element shown in FIG. 4;

FIG. 8 is an exploded view of certain interior movable parts of the hub; and

FIG. 9 is an enlarged section taken approximately along the line 9—9 in FIG. 8.

While the invention will be described in connection with a preferred embodiment, it will be understood that I do not intend to limit the invention to that embodiment. On the contrary, I intend to cover all alternatives, modifications and equivalents as may be included within the spirit and scope of the invention as defined by the appended claims.

Figure 1:
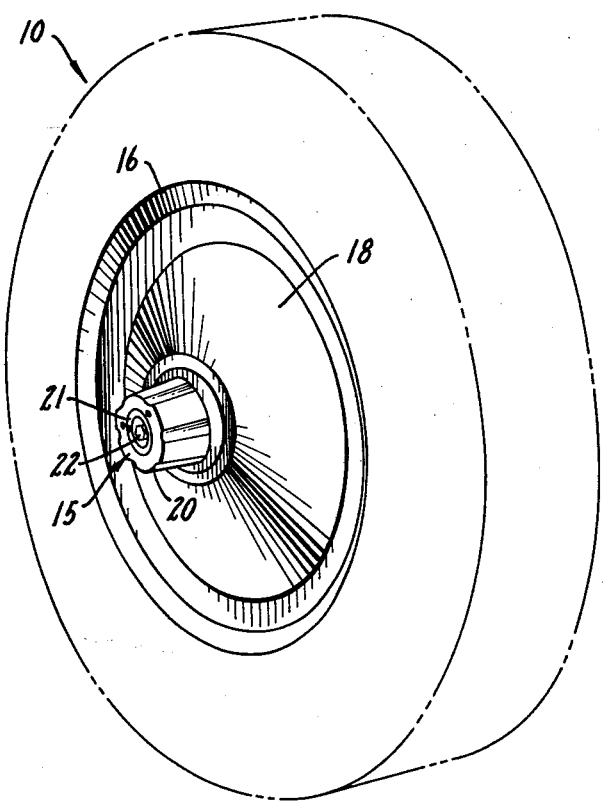
FIGURE 1 is a perspective of a vehicle wheel mounted on a hub embodying the present invention.

Turning now to FIGS. 1 and 3, there is shown a front wheel assembly 10 for a four wheel drive vehicle including a hub 15, constructed in accordance with the invention, and a wheel 16 which is secured by the hub 15 to an axle 17. In FIG. 1 an ornamental hub cap 18 is mounted on the face of the wheel 16 about the hub 15.

In keeping with the invention, the hub 15 includes a housing 20 that rotatably carries a single control member 21 having a nut-like portion 22. By applying a wrench to the portion 22 and rotating the member 21, the hub 15 locks or unlocks the wheel 16 relative to the axle 17. Preferably, a pair of indicia marks 23 and 24 indicating "two wheel drive" and "four wheel drive," respectively, are applied to the housing 20 and a position indicating mark 25 is placed on the rotatable control member 21. When the indicia mark 25 is rotated adjacent to the indicia mark 23, the hub 15 is unlocked and the wheel assembly 10 conditioned for two wheel drive. Applying a wrench to the nut portion 22 and rotating the control member 21 so that the indicia mark 25 is alined with the mark 24 locks the hub 15, i.e. couples the wheel 16 to the axle 17, and thus conditions the wheel assembly 10 for operation in four wheel drive.

To permit locking between the wheel 16 and the axle 17, a pair of interfitted, annular members 31 and 32 are secured, respectively to the wheel 16 and the axle 17 and are formed with axially extending lugs 33 and 34, respectively, adapted to come into radial alinement upon relative rotation of the members. The member 31 includes an annular flange 35 which receives a plurality of stud bolts 36 extending from a brake assembly (not shown) for the wheel assembly 10. The bolts 36 pass through holes in the wheel 16 and thus bolt the wheel solidly to the flange 35 of the member 31. The bolts 36 also extend forwardly through the hub housing 20 and thus are effective to secure the entire wheel and hub assembly together.

The member 32 is directly splined onto the axle 17 and is mounted for relative rotation within the annular member 31 on a plurality of nylon bearing elements 39. The lugs 34 on one side of the member 31, and a snap ring 40 disposed adjacent the bearing elements 39, restrict relative axial movement of the members 31, 32 without interfering with their free relative rotation.

Preferably, an annular gasket 37 is interposed between the housing 20 and the flange 35 and an O-ring seal 38 is mounted about the control member 21 so as to seal the hub 15 against loss of lubricant along the axle 17. A dowel 41 conveniently establishes the proper relative positions for the parts when assembling the housing 20 and the member 31.

For locking the members 31, 32 and thus the wheel 16 and the axle 17, against rotation, an annular locking element 45 is slidably mounted within the housing 20 and is formed with annularly disposed projections 46 adapted to fit between the lugs 33 and 34 when these lugs are in radial alinement. That is, when the lugs 33 and 34 are alined so as to define continuous radial slots, the disposition of the parts shown in FIGS. 3 and 4, it can be seen that movement of the locking element 45 to the right in these figures will slide the projections 46 between adjacent ones of the lugs 33 and also between adjacent ones of the lugs 34. When so disposed, the lugs 33, 34 and the projections 46 form what is virtually a continuous peripheral ring solidly locking the members 31, 32 together.

The projections 46 act, in effect, as keys which slide into a plurality of key slots defined by the alined lugs 33, 34. It will be appreciated that this solid keying of the wheel 16 to the axle 17 provides a connection which is at least as solid as the splined connection between the axle 17 and the member 32. In addition, this keyed interconnection between the lugs 33, 34 is quite close to the plane of the wheel 16 and thus very little torque forces are developed in the hub. It may further be noted that the housing 20 bears no part of the load imposed by the connection between the wheel 16 and the axle 17 and hence need not be formed of expensive, high strength material.

To slide the locking element 46 toward and away from the members 31, 32, a rotatable operator 50 is mounted within the locking element 45, and a follower and cam connection is provided between the operator and the element so that rotation of the operator 50 tends to both rotate the locking element 45 and urge it toward or away from the lugs 33, 34. In the preferred construction, the operator 50 carries a pair of oppositely extending follower pins received in a pair of identical cam slots 52 formed in the annular body of the locking element 45. The pins are pressed tightly into holes 53 formed in the operator 50 (see FIG. 8) and slide freely along the cam slots 52.

In the illustrated embodiment, the operator 50 is keyed to the control member 21 at 56. A snap ring 57 (see FIG. 3) locks the member 21 and the operator 50 against axial movement.

The cam slots 52 include short, circumferential, dwell portions 54 connected by spiral cam portions 55. It can thus be seen that rotation of the pins 51 from one set of dwell portions 54 along the cam portions 55 of the slots 52 exerts both rotational and axial forces on the locking element 45. The directions of these forces, of course, reverse upon opposite rotation of the pins 51.

With the pins 51 positioned in one of the dwell portions 54, as illustrated in FIG. 4, the locking member 45 is positioned against the end wall of the hub housing 20 and the projections 46 are well spaced from the lugs 33, 34. Swinging the pins 51 along the slot cam portions 55 to the opposite dwell portions 54 of the slots moves the locking element 45 to the right in FIG. 4 so that the projections 46 are fully seated between the lugs 33 and 34.

For holding the parts in either their locked or unlocked positions against jars and vibration, spring biased ball detents 60 are mounted in the locking element 45 so as to protrude into the cam slots 52 at each of the dwell portions 54. Each of the detents 60 (see FIG. 9) includes a sleeve 61 containing a ball 62 and a biasing spring 63. As best seen in FIG. 4, the pins 51, when moved to the ends of the slot dwell portions 54, snap over the spring biased balls 62 and are thus resiliently held in position. The snap action of the detents 60 not only resists displacement of the pins 51 but also gives the user of the hub 15 a reliable sense indication of when the hub has been fully locked or unlocked.

It will be understood that when the hub is unlocked, the wheel 16 and thus the member 31 rotates freely about the axle 17 and the member 32. Thus, the lugs 33 and 34 cannot be expected to be in alinement when it is desired to lock the hub. To reliably aline the lugs 33, 34 incident to rotation of the control member 21, the locking element 45 has at least one portion 65 extended toward the lugs 34 beyond the projections 46. This causes the portion 65 to catch one of the lugs 34 and rotate the member 32 with the axle 17 sufficiently far to bring the lugs 33, 34 into radial alinement. In the preferred construction, each of the projections 46 has such a portion 65 extended axially beyond the projections 46 to engage the lugs 34 before the bodies of the projections 46 engage the lugs 33. In this way, rotational and axial movement of the locking element 45, incident to rotation of the operator 50, from the position of the parts shown in FIG. 4 causes the extending portions 65 of the projections 46 to engage and pick up the lugs 34 before the lugs 33 are contacted. Continued rotation of the element 45 slightly turns the lugs 34, and thus the axle 17, until the lugs 33 and 34 move into radial alinement whereupon the projections 46 slip into locking position between the sets of lugs.

For insuring positive engagement between the projections 46 and the lugs 33, 34 as the hub is locked, the surfaces of the projections 46 and their extending portions 65 which face the lugs are sloped away from the lugs in the direction the projections move during unlocking of the hub. Thus, as best seen in FIG. 6, each projection 46 is formed with a sloping face 66 and each projection 65 is provided with a corresponding sloping face 67. In this figure, the direction the locking element 45 moves to lock the hub is downwardly and toward the right.

In operation, and referring to the single projection shown in FIG. 6, the portion 65 first strikes the lug 34 so that further movement of the element 45 to the right is arrested. The element 45 then turns downwardly and the sloping face 67 rides along the lug 34 with the projection 46 and its extending portion 65 moving a short distance to the right until the positions 46a and 65a are reached. It can be seen that this causes the projection 65 to catch the next lug 34 so that further rotational, i.e., downward, movement of the element 45 is accompanied by movement of the element 32.

With the projecting portion 65 fitted between adjacent ones of the lugs 34, the element 45 moves further to the right until the projection 46 strikes one of the lugs 33, whereupon the sloping face 66 rides along the lug 33. When the positions 46b, 65b are reached, the projection 46 will have moved to the right to catch the next one of the lugs 33. As the projection 46 engages the side of the next lug 33, the lugs 33, 34 are alined and further rotation of the operator 50 causes the locking element 45 to move into the fully locked position with the projections 46 snugly fitted between adjacent ones of the lugs 33, 34.

To initially move the projecting portions 65 against the lugs 34, that is, to move the element 45 from its FIG. 4 position to its full line FIG. 6 position, without idly rotating the element 45 as the operator 50 is turned, the locking element 45 is releasably held against rotation by a detent pin 70 until the portions 65 abut the lugs 34. The detent pin 70 (see FIG. 3) is mounted in the locking element 45 and is biased by a compressed spring 71 so that its end projects into an arcuate groove 72 formed on the inside of the housing 20 (see also FIG. 5). At one end of the groove 72, corresponding to the position of the pin 70 when the locking element 45 is in its fully unlocked, FIG. 3, position, there is formed a hole 73 into which the pin 70 drops to releasably hold the locking element 45 against rotation. A shoulder 74 on the pin 70 limits movement of the pin into the hole 73. The resistance of the pin 70 is sufficiently strong to permit the pins 51 to be rotated past the adjacent ball detents 60 and into the cam portions 55 of the slots 52 so that the locking element 45 is moved toward the members 31, 32 as the control 50 is initially turned. This lifts the pin 70 almost clear of the hole 73 and, as the projections 65 abut the lugs 34, the pin 70 is easily snapped from the hole 73 into the groove 72 as the locking element 45 is rotated further by the operator 50.

The pin 70 continues to resiliently bear on the bottom of the groove 72 so as to exert a slight drag as the element 45 is rotated. This drag, plus the friction resulting from sliding the projections 46 along the ends of the lugs 33, 34, tends to restrict free rotational movement of the element 45 and thus allows the pins 51, acting against the cam portions 55 of the slots 52, to continue exerting an axially directed force which urges the projections 46 against and between the lugs 33, 34 in the manner described above.

By way of summarizing the foregoing description of the hub 15, the operation of the parts will be briefly reviewed. It will be assumed that the parts start in their FIGS. 3 and 4 positions with the hub unlocked and the indicia marks 23 and 25 adjacent to one another. The hub is thus in its two wheel drive condition in which the wheel 16 is uncoupled from the axle 17.

Figure 2:
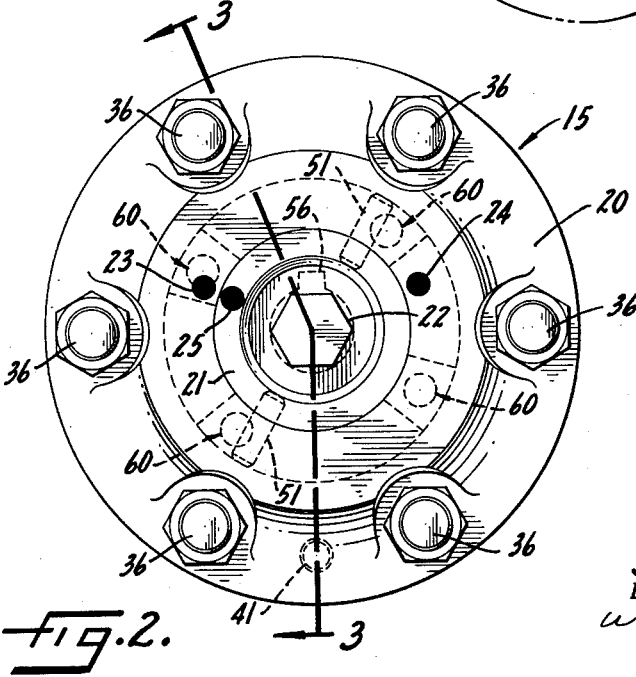
FIG. 2 is an enlarged end elevation of the hub shown in FIG. 1.

To lock the hub for four wheel drive operation, a wrench is applied to the nut-like portion 22 and the control member 21 is turned clockwise in FIGS. 2 and 5 so that the indicia mark 25 rotates toward the mark 24. Rotation of the member 21 causes the operator 50 to be rotated so that the pins 51 are snapped over the ball detents 60 and into the cam portions 55 of the slots 52. The detent pin 70, being seated in the hole 73, prevents rotation of the locking element 45 and thus the locking element is cammed toward the right in FIGS. 3 and 4 as the pins 51 move along the grooves 52.

When the portions 65 of the locking element projection 46 strike the lugs 34, further axial movement of the locking element 45 is prevented and continued rotation of the operator 50 rotates the locking element and snaps the detent pin 70 out of the hole 73 and into the groove 72. As the locking element 45 rotates, the sloping faces 67 on the projecting portions 65 ride down the lugs 34 so that the portions 65 enter between the lugs 34 to the point where the projections 46 abut the lugs 33.

The above description assumes, of course, that the lugs 33, 34 are not radially alined, a condition which may be normally expected. If the lugs are radially alined, the projections 46 simply enter between adjacent ones of the lugs so as to complete the locking operation.

With the projections 46 abutting the lugs 33, the locking element 45 again rotates under the driving force of the pins 51 moving along the slots 52 and this causes the projections 65, having caught the lugs 34, to rotate the element 32 and the attached axle 17 the slight amount required to bring the lugs 33, 34 into radial alinement. During this rotation, the sloping faces 66 on the projections 46 slide down the lugs 33 so that the projections 46 enter between the lugs 33 as the lugs 34 are brought into radial alinement. Further rotation of the locking element 45 is prevented by engagement between the projections 46 and the lugs 33 and thus the concluding movement of the pins 51 along the slots 52 drives the locking element 45 fully toward the right in FIGS. 3 and 4 so as to seat the projections 46 snugly between the adjacent lugs 33, 34. Finally, the pins 51 snap over the ball detents 60 and thus secure the parts in their hub-locked condition with the indicia marks 24, 25 adjacent one another.

To unlock the hub, it will be apparent that the control member 21 is simply swung counterclockwise as seen in FIGS. 2 and 5 so that the pins 51 again traverse the slots 52 to withdraw the projections 46 from between the lugs 33, 34. As the lugs 33 are cleared, further rotation of the operator 50 rotates the locking element 45 to the point where the detent pin 70 again drops into the hole 73 and the pins 51 snap over the detents 60. This returns the parts to their FIGS. 3 and 4 positions.

It can now be fully appreciated that the locking hub 15 is particularly easy to manipulate since a single element is simply rotated through an arc of only approximately 135° to fully lock or unlock the hub. Because of the combined axial and rotational movement of the locking element 45, the hub cannot jam and, due to the sloping faces 66, 67, the lugs 33, 34 are positively and reliably picked up each time the hub is locked. Furthermore, the provision and operation of the portions 65 on the projections 46 eliminates the necessity for rocking the vehicle to bring the lugs 33, 34 into alinement.

As a further important point, it will be noted that not only do the projections 46 firmly and solidly key together the members 31, 32, and thus the wheels 16 and the axle 17, but also in the event that the locking element 45 should crack or otherwise fail while the hub is locked, the projections 46 cannot inadvertently be displaced from their locked positions between the lugs 33, 34. The hub will thus "fail safe" and brakage will not interrupt the transmission of driving force from the axle 17 to the wheel 16.

Those familiar with manufacturing techniques and prior types of locking hubs will appreciate that the hub 15 is of a particularly compact design which is economical to manufacture.

I claim as my invention:

1. A hub for selectively locking a wheel on an axle comprising, in combination, a pair of interfitted, annular members one secured to said axle and the other to said wheel, said members having axially extending lugs adapted to come into radial alinement upon relative rotation of said members, a housing disposed about said members, a locking element slidably mounted in said housing for movement toward and away from said lugs, said locking element having annularly disposed projections adapted to fit between the extending lugs of said members when they are in radial alinement so as to lock said wheel to said hub, and means operable from outside of said housing to both rotate said element and urge it toward or away from said members, said locking element having at least one portion extending beyond said projections toward the member secured to said axle so that said rotation of said element causes said portion to catch one of said lugs and rotate the axle sufficiently far to bring said lugs into radial alinement, thus permitting said projections to enter between said lugs and lock the wheel to the axle.

2. A hub for selectively locking a wheel on an axle comprising, in combination, a pair of interfitted, annular members one secured to said axle and the other to said wheel, said members having axially extending lugs adapted to come into radial alinement upon relative rotation of said members, a housing disposed about said members, an annular locking element slidably mounted in said housing for movement toward and away from said lugs, said locking element having annularly disposed projections adapted to fit between the extending lugs of said members when they are in radial alinement so as to lock said wheel to said hub, a rotatable operator mounted within said annular locking element, means for rotating said operator from the outside of said housing, and a follower and cam connection between said element and said operator so that rotation of the operator tends to both rotate the element and urge it toward or away from said members, said locking element having at least one portion extending beyond said projections toward the member secured to said axle so that rotation of said element incident to rotation of said operator causes said portion to catch one of said lugs and rotate the axle sufficiently far to bring said lugs into radial alinement, thus permitting said projections to enter between said lugs and lock the wheel to the axle.

3. A hub for selectively locking a wheel on an axle comprising, in combination, a pair of interfitted, annular members one secured to said axle and the other to said wheel, said members having axially extending lugs adapted to come into radial alinement upon relative rotation of said members, a housing disposed about said members, an annular locking element slidably mounted in said housing for movement toward and away from said lugs, said locking element having annularly disposed projections adapted to fit between the extending lugs of said members when they are in radial alinement so as to lock said wheel to said hub, a rotatable operator mounted within said annular locking element, means for rotating said operator from the outside of said housing, a follower and cam connection between said element and said operator so that rotation of the operator tends to both rotate the element and urge it toward or away from said members, said locking element having at least one portion extending beyond said projections toward the member secured to said axle so that rotation of said element incident to rotation of said operator causes said portion to catch one of said lugs and rotate the axle sufficiently far to bring said lugs into radial alinement, thus permitting said projections to enter between said lugs and lock the wheel to the axle, and means for releasably holding said locking element against rotation with said operator until said extending portion is cammed into engagement with the member secured to said axle.

4. A hub for selectively locking a wheel on an axle comprising, in combination, a pair of members one secured to said axle and the other to said wheel, said members having axially extending lugs adapted to come into alinement upon relative rotation of said members, a housing, a locking element mounted on said housing for movement toward and away from said lugs, said locking element having projections adapted to fit between the extending lugs of said members when they are in alinement so as to lock said wheel to said hub, a rotatable operator mounted on said housing, a pin and cam slot connection between said element and said operator so that rotation of the operator tends to rotate the element and urge it toward or away from said members, said locking element having at least one portion extending beyond said projections toward the member secured to said axle so that rotation of said element incident to rotation of said operator causes said portion to catch one of said lugs and rotate the axle sufficiently far to bring said lugs into alinement, thus permitting said projections to enter between said lugs and lock the wheel to the axle, the surfaces of said locking element projections and extending portion which face said lugs when the hub is unlocked being sloped away from the lugs in the direction the projections move during unlocking of the hub so that, when the hub is being locked, said projections and extending portions ride between said lugs as said element is rotated and urged toward said members.

5. A hub for selectively locking a wheel on an axle comprising, in combination, a pair of interfitted, annular members one secured to said axle and the other to said wheel, said members having axially extending lugs adapted to come into radial alinement upon relative rotation of said members, a housing disposed about said members, an annular locking element slidably mounted in said housing for movement toward and away from said lugs, said locking element having annularly disposed projections adapted to fit between the extending lugs of said members when they are in radial alinement so as to lock said wheel to said hub, a rotatable operator mounted within said annular locking element, means for rotating said operator from the outside of said housing, and a follower and cam connection between said element and said operator so that rotation of the operator tends to both rotate the element and urge it toward or away from said members, said locking element having at least one portion extending beyond said projections toward the member secured to said axle so that rotation of said element incident to rotation of said operator causes said portion to catch one of said lugs and rotate the axle sufficiently far to bring said lugs into radial alinement, thus permitting said projections to enter between said lugs and lock the wheel to the axle, the surfaces of said locking element projections and extending portion which face said lugs when the hub is unlocked being sloped away from the lugs in the direction the projections move during unlocking of the hub so that, when the hub is being locked, said projections and extending portions ride between said lugs as said element is rotated and urged towards said members.

6. A hub for selectively locking a wheel on an axle comprising, in combination, a pair of interfitted, annular members one secured to said axle and the other to said wheel, said members having axially extending lugs adapted to come into radial alinement upon relative rotation of said members, a housing disposed about said members, an annular locking element slidably mounted in said housing for movement toward and away from said lugs, said locking element having annularly disposed projections adapted to fit between the extending lugs of said members when they are in radial alinement so as to lock said wheel to said hub, a rotatable operator mounted within said annular locking element, means for rotating said operator from the outside of said housing, a pin and cam slot connection between said element and said operator so that rotation of the operator tends to both rotate the element and urge it toward or away from said members, said locking element having at least one portion extending beyond said projections toward the member secured to said axle so that rotation of said element incident to rotation of said operator causes said portion to catch one of said lugs and rotate the axle sufficiently far to bring said lugs into radial alinement, thus permitting said projections to enter between said lugs and lock the wheel to the axle, the surfaces of said locking element projections and extending portion which face said lugs when the hub is unlocked being sloped away from the lugs in the direction the projections move during unlocking of the hub so that, when the hub is being locked, said projections and extending portions ride between said lugs as said element is rotated and urged toward said members, and means for releasably holding said locking element against rotation with said operator until said extending portion is cammed into engagement with the member secured to said axle.

References Cited in the file of this patent

UNITED STATES PATENTS

| | | |
|---|---|---|
| 2,788,103 | Requa | Apr. 9, 1957 |
| 2,894,775 | Harless | July 14, 1959 |